US010363721B2

(12) United States Patent
Tsunoda et al.

(10) Patent No.: US 10,363,721 B2
(45) Date of Patent: Jul. 30, 2019

(54) INTERMEDIATE FILM FOR LAMINATED GLASS AND LAMINATED GLASS

(71) Applicant: SEKISUI CHEMICAL CO., LTD., Osaka, Osaka (JP)

(72) Inventors: Ryuta Tsunoda, Kouka (JP); Yasuyuki Izu, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 222 days.

(21) Appl. No.: 14/898,119

(22) PCT Filed: Jun. 13, 2014

(86) PCT No.: PCT/JP2014/065811
§ 371 (c)(1),
(2) Date: Dec. 11, 2015

(87) PCT Pub. No.: WO2014/200107
PCT Pub. Date: Dec. 18, 2014

(65) Prior Publication Data
US 2016/0152007 A1 Jun. 2, 2016

(30) Foreign Application Priority Data

Jun. 14, 2013 (JP) .................. 2013-125728
Jan. 29, 2014 (JP) .................. 2014-014942
Jan. 29, 2014 (JP) .................. 2014-014943

(51) Int. Cl.
| B23B 27/08 | (2006.01) |
|---|---|
| C08K 13/02 | (2006.01) |
| C08K 5/56 | (2006.01) |
| C08J 5/18 | (2006.01) |
| C03C 27/06 | (2006.01) |
| B32B 17/10 | (2006.01) |
| B32B 27/08 | (2006.01) |
| C08K 5/098 | (2006.01) |
| C08K 5/103 | (2006.01) |
| C08K 5/3465 | (2006.01) |
| G02B 5/20 | (2006.01) |

(52) U.S. Cl.
CPC .. *B32B 17/10761* (2013.01); *B32B 17/10036* (2013.01); *B32B 17/10339* (2013.01); *B32B 17/10651* (2013.01); *B32B 27/08* (2013.01); *C03C 27/06* (2013.01); *C08J 5/18* (2013.01); *C08K 5/098* (2013.01); *C08K 5/103* (2013.01); *C08K 5/3465* (2013.01); *C08K 5/56* (2013.01); *C08K 13/02* (2013.01); *G02B 5/208* (2013.01); *B32B 2307/408* (2013.01); *B32B 2307/4026* (2013.01); *B32B 2307/412* (2013.01); *B32B 2307/558* (2013.01); *B32B 2419/00* (2013.01); *B32B 2605/00* (2013.01); *B32B 2605/006* (2013.01); *B32B 2605/08* (2013.01); *C08J 2329/14* (2013.01)

(58) Field of Classification Search
None
See application file for complete search history.

(56) References Cited

U.S. PATENT DOCUMENTS

| 2004/0234778 | A1 | 11/2004 | Fukatani et al. |
|---|---|---|---|
| 2006/0050425 | A1 | 3/2006 | Muromachi et al. |
| 2009/0035583 | A1 | 2/2009 | Fisher |
| 2012/0162752 | A1 | 6/2012 | Kitano et al. |
| 2013/0143049 | A1 | 6/2013 | Kitano et al. |
| 2013/0323517 | A1* | 12/2013 | Kitano .............. B32B 17/10633 428/437 |
| 2014/0193646 | A1 | 7/2014 | Kitano et al. |
| 2014/0377567 | A1 | 12/2014 | Ii et al. |
| 2015/0346404 | A1 | 12/2015 | Bak et al. |

FOREIGN PATENT DOCUMENTS

| CN | 102625786 A | 8/2012 |
|---|---|---|
| EP | 2 471 761 A1 | 7/2012 |
| EP | 2 471 762 A1 | 7/2012 |
| EP | 2 610 226 A1 | 7/2013 |
| EP | 2 679 557 A1 | 1/2014 |

(Continued)

OTHER PUBLICATIONS

Written Opinion of the International Searching Authority (PCT/ISA/237) for Application No. PCT/JP2014/065811 dated Sep. 16, 2014 (English Translation mailed Dec. 23, 2015).
Written Opinion of the International Searching Authority (PCT/ISA/237) for Application No. PCT/JP2014/065812 dated Sep. 16, 2014 (English Translation mailed Dec. 23, 2015).
European Office Action for the Application No. 14 810 912.7 dated Jan. 30, 2019.
International Search Report for the Application No. PCT/JP2014/065811 dated Sep. 16, 2014.

(Continued)

*Primary Examiner* — Sheeba Ahmed
(74) *Attorney, Agent, or Firm* — Cheng Law Group, PLLC

(57) ABSTRACT

There is provided an interlayer film for laminated glass with which any of the anti-glare property, light resistance and visibility in a dark place of laminated glass can be enhanced. The interlayer film for laminated glass according to the present invention includes a thermoplastic resin and has a ratio L's/Ls of the relative scotopic vision luminance L's to the relative photopic vision luminance Ls to be greater than or equal to 1.0 at the time of preparing laminated glass with two sheets of clear glass in accordance with JIS R3202 (1996), and the interlayer film for laminated glass according to the present invention preferably includes at least one kind of ingredient among a phthalocyanine compound, a naphthalocyanine compound, an anthracyanine compound and an indanthrene compound which have a maximum absorption wavelength greater than or equal to 550 nm and less than or equal to 750 nm.

10 Claims, 1 Drawing Sheet

(56) References Cited

FOREIGN PATENT DOCUMENTS

| | | |
|---|---|---|
| EP | 2 613 478 A1 | 12/2014 |
| JP | 6-191906 A | 7/1994 |
| JP | 6-293539 A | 10/1994 |
| JP | 2004-26547 A | 1/2004 |
| JP | 2010-138028 A | 6/2010 |
| JP | 2010-265160 A | 11/2010 |
| WO | WO-03/018502 A1 | 3/2003 |
| WO | WO-2010/119771 A1 | 10/2010 |
| WO | WO-2012/026487 A1 | 3/2012 |
| WO | WO-2012/115197 A1 | 8/2012 |
| WO | WO 2013/118890 A1 | 8/2013 |

OTHER PUBLICATIONS

Written Opinion of the International Searching Authority (PCT/ISA/237) for Application No. PCT/JP2014/065811 dated Sep. 16, 2014.

International Search Report for the Application No. PCT/JP2014/065812 dated Sep. 16, 2014.

Written Opinion of the International Searching Authority (PCT/ISA/237) for Application No. PCT/JP2014/065812 dated Sep. 16, 2014.

Notification of Reasons for Refusal for the Application No. 2014-530983 from Japan Patent Office dated Jun. 26, 2018.

European Office Action for Application No. EP 14 811 566.0 dated Mar. 28, 2018.

European Office Action for Application No. EP 14 810 912.7 dated Mar. 28, 2018.

Final Office Action for the U.S. Appl. No. 14/898,107 from The United States Patent and Trademark Office dated Jun. 12, 2018.

The First Office Action for the Application No. 201480033768.7 from The State Intellectual Property Office of the People's Republic of China dated Jul. 21, 2017.

Non-Final Office Action for the U.S. Appl. No. 14/898,107 from The United States Patent and Trademark Office dated Aug. 30, 2017.

Supplementary European Search Report for the Application No. EP 14 81 1566 dated Dec. 23, 2016.

Supplementary European Search Report for the Application No. EP 14 81 0912 dated Jan. 2, 2017.

* cited by examiner

[FIG. 1]
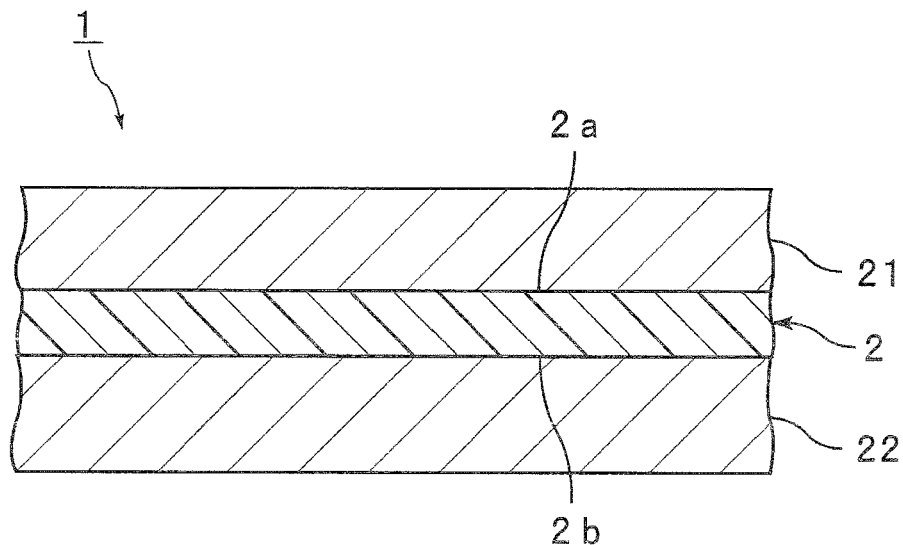
[FIG. 2]
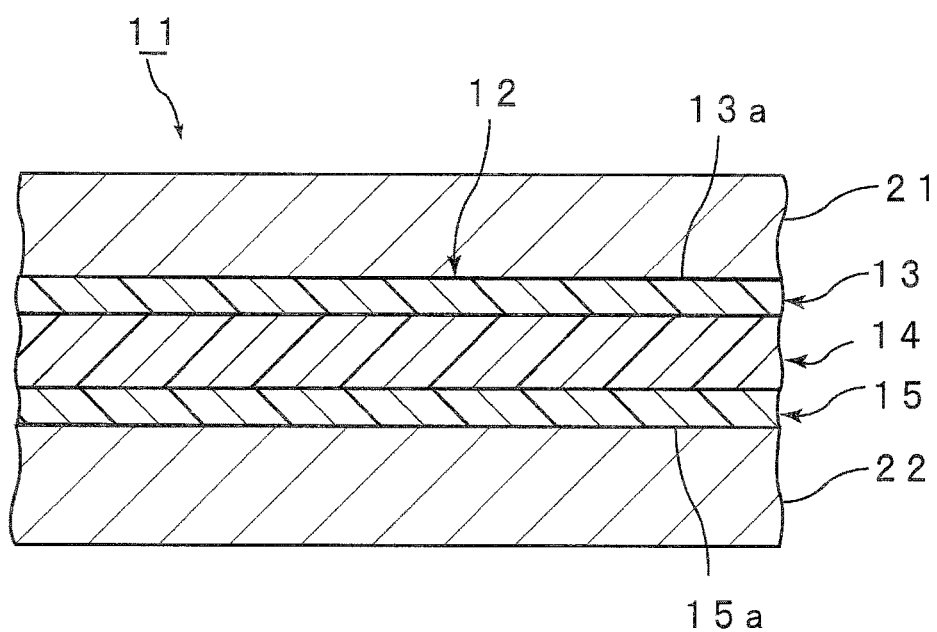

INTERMEDIATE FILM FOR LAMINATED GLASS AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. For example, the laminated glass is produced by sandwiching an intermediate film for laminated glass between a pair of glass plates.

For example, with regard to an automobile provided with the laminated glass, even when a driver of the automobile does not directly view light from a headlight of an oncoming car, the driver has a psychologically unpleasant feeling due to the light passing through the laminated glass. Moreover, the visual acuity of a driver is temporarily lowered when the driver directly views light from a headlight of an oncoming car, and this may adversely affect the driving operations. In view of such problems, the enhancement in the anti-glare property of laminated glass has been strongly desired.

An interlayer film in which a pigment, a dye, a coloring agent or the like as a material having visible light absorbing properties is used in order to enhance the anti-glare property has been known.

Moreover, as an example of the interlayer film enhanced in the anti-glare property, an interlayer film for laminated glass including a tetraazaporphyrin compound has been disclosed in the following Patent Document 1.

RELATED ART DOCUMENT

Patent Document

Patent Document 1: JP 2010-138028 A

SUMMARY OF THE INVENTION

Problems to be Solved by the Invention

An interlayer film prepared with a pigment, a dye or a coloring agent absorbs most of the light in a visible light region of the wavelength range of 380 to 780 nm. As a result, the visible light transmittance of the interlayer film is sometimes lowered. Moreover, even in the case where the visible light transmittance is high, the visibility in a dark place such as an indoor place at night and an outdoor place at night is sometimes lowered. Accordingly, there are cases where an interlayer film prepared with a pigment, a dye or a coloring agent cannot be used for a windshield of an automobile in which high visibility in a dark place is especially required.

In the interlayer film described in Patent Document 1, even if the visible light transmittance and anti-glare property can be enhanced since a tetraazaporphyrin compound is used, there is a problem that the light resistance of the interlayer film is lowered.

An object of the present invention is to provide an interlayer film for laminated glass with which any of the anti-glare property, light resistance and visibility in a dark place of laminated glass can be enhanced, and to provide laminated glass prepared with the interlayer film for laminated glass.

Means for Solving the Problems

According to a broad aspect of the present invention, there is provided an interlayer film for laminated glass including a thermoplastic resin and provided with a first configuration or a second configuration, the first configuration including at least one kind of ingredient among a phthalocyanine compound with a maximum absorption wavelength greater than or equal to 550 nm and less than or equal to 750 nm, a naphthalocyanine compound with a maximum absorption wavelength greater than or equal to 550 nm and less than or equal to 750 nm, an anthracyanine compound with a maximum absorption wavelength greater than or equal to 550 nm and less than or equal to 750 nm and an indanthrene compound with a maximum absorption wavelength greater than or equal to 550 nm and less than or equal to 750 nm is contained in the interlayer film, the second configuration having an absolute value of the difference in visible light transmittance $\Delta A-Y$ represented by the formula: (A–Y after irradiated with ultraviolet rays)–(A–Y before irradiated with ultraviolet rays) is less than or equal to 1.0 at the time of preparing laminated glass with two sheets of clear glass in accordance with JIS R3202 (1996) and then irradiating the prepared laminated glass with ultraviolet rays for 500 hours using a quartz glass mercury lamp of 750 W in accordance with JIS R3205, wherein a ratio L's/Ls of the relative scotopic vision luminance L's to the relative photopic vision luminance Ls is greater than or equal to 1.0 at the time of preparing laminated glass with two sheets of clear glass in accordance with JIS R3202 (1996) in the case where the interlayer film has the first configuration, a ratio L's/Ls of the relative scotopic vision luminance L's to the relative photopic vision luminance Ls is greater than 1.0 at the time of preparing laminated glass with two sheets of clear glass in accordance with JIS R3202 (1996) in the case where the interlayer film has the second configuration.

According to a broad aspect of the present invention, there is provided an interlayer film for laminated glass including a thermoplastic resin and at least one kind of ingredient among a phthalocyanine compound with a maximum absorption wavelength greater than or equal to 550 nm and less than or equal to 750 nm, a naphthalocyanine compound with a maximum absorption wavelength greater than or equal to 550 nm and less than or equal to 750 nm, an anthracyanine compound with a maximum absorption wavelength greater than or equal to 550 nm and less than or equal to 750 nm and an indanthrene compound with a maximum absorption wavelength greater than or equal to 550 nm and less than or equal to 750 nm (the above-mentioned first configuration), wherein a ratio L's/Ls of the relative scotopic vision luminance L's to the relative photopic vision luminance Ls is greater than or equal to 1.0 at the time of preparing laminated glass with two sheets of clear glass in accordance with JIS R3202 (1996). In this interlayer film for laminated glass, it is preferred that the ratio L's/Ls be greater than 1.0.

According to another broad aspect of the present invention, there is provided an interlayer film for laminated glass including a thermoplastic resin and having an absolute value of the difference in visible light transmittance $\Delta A-Y$ represented by the formula: (A–Y after irradiated with ultraviolet rays)–(A–Y before irradiated with ultraviolet rays) to be less than or equal to 1.0 at the time of preparing laminated glass with two sheets of clear glass in accordance with JIS R3202 (1996) and then irradiating the prepared laminated glass with ultraviolet rays for 500 hours using a quartz glass mercury lamp of 750 W in accordance with JIS R3205 (the above-mentioned second configuration), wherein a ratio L's/Ls of the relative scotopic vision luminance L's to the relative photopic vision luminance Ls is greater than 1.0 at the time of preparing laminated glass with two sheets of clear glass in accordance with JIS R3202 (1996).

In a specific aspect of the interlayer film for laminated glass according to the present invention, the interlayer film further includes at least one kind of metal salt among an alkali metal salt and an alkaline earth metal salt.

In a specific aspect of the interlayer film for laminated glass according to the present invention, the thermoplastic resin is a polyvinyl acetal resin.

In a specific aspect of the interlayer film for laminated glass according to the present invention, the interlayer film further includes a plasticizer.

According to a broad aspect of the present invention, there is provided laminated glass including a first laminated glass member, a second laminated glass member and the interlayer film for laminated glass described above, wherein the interlayer film for laminated glass is arranged between the first laminated glass member and the second laminated glass member.

Effect of the Invention

Since the interlayer film for laminated glass according to the present invention includes a thermoplastic resin and is provided with a first configuration or a second configuration, the first configuration includes at least one kind of ingredient among a phthalocyanine compound with a maximum absorption wavelength greater than or equal to 550 nm and less than or equal to 750 nm, a naphthalocyanine compound with a maximum absorption wavelength greater than or equal to 550 nm and less than or equal to 750 nm, an anthracyanine compound with a maximum absorption wavelength greater than or equal to 550 nm and less than or equal to 750 nm and an indanthrene compound with a maximum absorption wavelength greater than or equal to 550 nm and less than or equal to 750 nm is contained in the interlayer film; the second configuration has an absolute value of the difference in visible light transmittance ΔA–Y represented by the formula: (A–Y after irradiated with ultraviolet rays)– (A–Y before irradiated with ultraviolet rays) is less than or equal to 1.0 at the time of preparing laminated glass with two sheets of clear glass in accordance with JIS R3202 (1996) and then irradiating the prepared laminated glass with ultraviolet rays for 500 hours using a quartz glass mercury lamp of 750 W in accordance with JIS R3205; a ratio L's/Ls of the relative scotopic vision luminance L's to the relative photopic vision luminance Ls is greater than or equal to 1.0 at the time of preparing laminated glass with two sheets of clear glass in accordance with JIS R3202 (1996) in the case where the interlayer film has the first configuration; and a ratio L's/Ls of the relative scotopic vision luminance L's to the relative photopic vision luminance Ls is greater than 1.0 at the time of preparing laminated glass with two sheets of clear glass in accordance with JIS R3202 (1996) in the case where the interlayer film has the second configuration, it is possible to enhance any of the anti-glare property, light resistance and visibility in a dark place of laminated glass prepared with the interlayer film for laminated glass according to the present invention.

In the case where the interlayer film for laminated glass according to the present invention includes a thermoplastic resin and at least one kind of ingredient among a phthalocyanine compound with a maximum absorption wavelength greater than or equal to 550 nm and less than or equal to 750 nm, a naphthalocyanine compound with a maximum absorption wavelength greater than or equal to 550 nm and less than or equal to 750 nm, an anthracyanine compound with a maximum absorption wavelength greater than or equal to 550 nm and less than or equal to 750 nm and an indanthrene compound with a maximum absorption wavelength greater than or equal to 550 nm and less than or equal to 750 nm (the above-mentioned first configuration), and furthermore, a ratio L's/Ls of the relative scotopic vision luminance L's to the relative photopic vision luminance Ls is greater than or equal to 1.0 at the time of preparing laminated glass with the interlayer film for laminated glass according to the present invention and two sheets of clear glass in accordance with JIS R3202 (1996), it is possible to effectively enhance any of the anti-glare property, light resistance and visibility in a dark place of laminated glass prepared with the interlayer film for laminated glass according to the present invention.

BRIEF DESCRIPTION OF DRAWINGS

FIG. 1 is a partially cut-away sectional view showing laminated glass prepared with an interlayer film for laminated glass in accordance with one embodiment of the present invention.

FIG. 2 is a partially cut-away sectional view showing a modified example of laminated glass prepared with an interlayer film for laminated glass in accordance with one embodiment of the present invention.

MODE(S) FOR CARRYING OUT THE INVENTION

Hereinafter, the details of the present invention will be described.

The interlayer film for laminated glass according to the present invention includes a thermoplastic resin.

The interlayer film for laminated glass according to the present invention includes the following number 1' configuration or number 2' configuration. The interlayer film for laminated glass according to the present invention needs only to include at least one configuration among the number 1' configuration and the number 2' configuration. It is preferred that the interlayer film for laminated glass according to the present invention include the number 1' configuration, it is preferred that the interlayer film for laminated glass include the number 2' configuration, and it is more preferred that the interlayer film for laminated glass include both of the number 1' configuration and the number 2' configuration.

Number 1' Configuration:

At least one kind of ingredient among a phthalocyanine compound with a maximum absorption wavelength greater than or equal to 550 nm and less than or equal to 750 nm, a naphthalocyanine compound with a maximum absorption wavelength greater than or equal to 550 nm and less than or equal to 750 nm, an anthracyanine compound with a maximum absorption wavelength greater than or equal to 550 nm and less than or equal to 750 nm and an indanthrene compound with a maximum absorption wavelength greater than or equal to 550 nm and less than or equal to 750 nm is contained in the interlayer film (the first configuration), and a ratio L's/Ls of the relative scotopic vision luminance L's to the relative photopic vision luminance Ls is greater than or equal to 1.0 at the time of preparing laminated glass with two sheets of clear glass in accordance with JIS R3202 (1996).

Number 2' Configuration:

An absolute value of the difference in visible light transmittance ΔA–Y represented by the formula: (A–Y after irradiated with ultraviolet rays)–(A–Y before irradiated with ultraviolet rays) is less than or equal to 1.0 at the time of preparing laminated glass with two sheets of clear glass in accordance with JIS R3202 (1996) and then irradiating the prepared laminated glass with ultraviolet rays for 500 hours using a quartz glass mercury lamp of 750 W in accordance with JIS R3205 (the second configuration), and a ratio L's/Ls of the relative scotopic vision luminance L's to the relative photopic vision luminance Ls is greater than 1.0 at the time of preparing laminated glass with two sheets of clear glass in accordance with JIS R3202 (1996).

Since the interlayer film for laminated glass according to the present invention includes the above-described configuration, in laminated glass prepared with the interlayer film for laminated glass according to the present invention, it is possible 1) to enhance the anti-glare property, 2) to enhance the light resistance, and 3) to enhance the visibility in a dark place. It has hitherto been difficult to allow the effects of all of the above-mentioned 1), 2) and 3) to be exerted in an interlayer film. In contrast, the present inventors have found a configuration enabling the effects of all of the above-mentioned 1), 2) and 3) to be exerted. In the present invention, it is possible to obtain the effects of 1) high anti-glare property, 2) high light resistance and 3) high visibility in a dark place, the combination of which has hitherto been difficult to be obtained, in combination.

It is preferred that the interlayer film for laminated glass according to the present invention include a thermoplastic resin and at least one kind of ingredient (hereinafter, sometimes described as Ingredient X) among a phthalocyanine compound with a maximum absorption wavelength greater than or equal to 550 nm and less than or equal to 750 nm, a naphthalocyanine compound with a maximum absorption wavelength greater than or equal to 550 nm and less than or equal to 750 nm, an anthracyanine compound with a maximum absorption wavelength greater than or equal to 550 nm and less than or equal to 750 nm and an indanthrene compound with a maximum absorption wavelength greater than or equal to 550 nm and less than or equal to 750 nm. By allowing the above-mentioned Ingredient X to be contained in the interlayer film for laminated glass according to the present invention, in laminated glass prepared with the interlayer film for laminated glass according to the present invention, it is possible 1) to further enhance the anti-glare property, 2) to further enhance the light resistance, and 3) to enhance the visibility in a dark place, and any of the performance of 1), 2) and 3) can be further enhanced.

Hereinafter, the details of materials constituting the interlayer film for laminated glass according to the present invention and a ratio L's/Ls of the relative scotopic vision luminance L's to the relative photopic vision luminance Ls will be described.

(Relative Scotopic Vision Luminance L's and Relative Photopic Vision Luminance Ls)

Laminated glass obtained at the time of preparing laminated glass with an interlayer film for laminated glass according to the present invention and two sheets of clear glass in accordance with JIS R3202 (1996) is defined as Laminated glass C. It is preferred that the two sheets of clear glass used for the Laminated glass C be two sheets of transparent float plate glass with a thickness of 2.5 mm. Moreover, it is preferred that the interlayer film for laminated glass used for the Laminated glass C be an interlayer film for laminated glass with a thickness of 0.76 mm. This Laminated glass C can be obtained by allowing the interlayer film to be arranged between the two sheets of clear glass. The relative scotopic vision luminance L's of Laminated glass C is preferably greater than or equal to 60 and preferably less than or equal to 100. When the relative scotopic vision luminance L's is greater than or equal to the above preferred lower limit, it is possible to obtain laminated glass excellent in visibility in a dark place. When the relative scotopic vision luminance L's is less than or equal to the above preferred upper limit, it is possible to obtain laminated glass further excellent in anti-glare property. The relative scotopic vision luminance L's can be adjusted depending on the content of the below-mentioned Ingredient X or the below-mentioned Ingredient Y similar to Ingredient X. The relative scotopic vision luminance L's of Laminated glass C is more preferably greater than or equal to 80 and more preferably less than or equal to 90.

The relative photopic vision luminance Ls of the Laminated glass C is preferably greater than or equal to 50 and preferably less than or equal to 85. When the relative photopic vision luminance Ls is greater than or equal to the above preferred lower limit, it is possible to obtain laminated glass in which the visible light transmittance is further enhanced. When the relative photopic vision luminance Ls is less than or equal to the above preferred upper limit, it is possible to obtain laminated glass further excellent in anti-glare property. The relative photopic vision luminance Ls can be adjusted depending on the content of the below-mentioned Ingredient X or the below-mentioned Ingredient Y similar to Ingredient X. The relative photopic vision luminance Ls of Laminated glass C is more preferably greater than or equal to 60 and more preferably less than or equal to 82. It is preferred that the Laminated glass C have a relative photopic vision luminance Ls greater than or equal to 50 and less than or equal to 85 and a relative scotopic vision luminance L's greater than or equal to 60 and less than or equal to 100. By allowing both of the relative photopic vision luminance Ls and the relative scotopic vision luminance L's to lie within the above-mentioned respective preferred ranges, it is possible to obtain laminated glass further excellent in visibility in a dark place and the anti-glare property.

In the present invention, the ratio L's/Ls of the relative scotopic vision luminance L's to the relative photopic vision luminance Ls of the Laminated glass C is greater than or equal to 1.0. By allowing the ratio L's/Ls to be greater than or equal to 1.0, the anti-glare property, light resistance and visibility in a dark place of the resulting laminated glass can be enhanced. The ratio L's/Ls is preferably greater than 1.0, more preferably greater than or equal to 1.05, preferably less than or equal to 1.50, and more preferably less than or equal to 1.32. When the ratio L's/Ls is less than or equal to the above preferred upper limit, it is possible 1) to enhance the anti-glare property, 2) to enhance the light resistance, and 3) to effectively enhance the visibility in a dark place, of the laminated glass.

Although the measuring method for the relative scotopic vision luminance L's and the relative photopic vision luminance Ls is not particularly limited, for example, it is preferred that the measurement be performed by the following method. First, an interlayer film for laminated glass according to the present invention is arranged between two sheets of clear glass in accordance with JIS R3202 (1996) and the sheets are press-bonded to obtain a sheet of laminated glass. Using a spectroradiometer ("SR-3AR" available from TOPCON TECHNOHOUSE CORPORATION) and a high pressure mercury lamp ("S-LIGHT SA160" available from NIPPON GIJUTSU CENTER Co., LTD.) as a light source, the resulting sheet of laminated glass is measured for the scotopic vision luminance L' and photopic vision luminance L. At the time of measurement, the sheet of laminated glass is arranged at a distance of 500 mm from the light receiving part of the spectroradiometer in the light receiving direction so that the plane of the laminated glass is orthogonal to the light receiving direction of the spectroradiometer, and the above-mentioned light source is arranged at a distance of 3500 mm from the light receiving part of the spectroradiometer in the light receiving direction. Next, the scotopic vision luminance $L'_0$ and photopic vision luminance $L_0$ are measured in the same manner as that for the measurement of the scotopic vision luminance L' and photopic vision luminance L except that a sheet of laminated glass is not arranged. In this connection, for the calculation of the scotopic vision luminance L', photopic vision luminance L, scotopic vision luminance $L'_0$ and photopic vision luminance $L_0$, the CIE standard spectral luminous efficiency is used. From the resulting scotopic vision luminance L', photopic vision luminance L, scotopic vision luminance $L'_0$ and photopic vision luminance $L_0$, the relative scotopic vision luminance L's and relative photopic vision luminance Ls are calculated according to the following equations. In this connection, the above-mentioned measurement is performed under an environment where the photopic vision luminance becomes less than or equal to 0.015 $Cd/m^2$ in the case of not allowing a sheet of laminated glass to be arranged and not allowing the light source to be lighted on.

Relative scotopic vision luminance $L's=100\times$(scotopic vision luminance $L'$)/(scotopic vision luminance $L'_0$)

Relative photopic vision luminance $Ls=100\times$(photopic vision luminance $L$)/(photopic vision luminance $L_0$)

(Light Resistance)

With regard to the interlayer film for laminated glass according to the present invention, by allowing the absolute value of the difference in visible light transmittance ΔA−Y (the value represented by the following formula) to lie within the above preferred range at the time of preparing laminated glass with two sheets of clear glass in accordance with JIS R3202 (1996) and then irradiating the prepared laminated glass with ultraviolet rays for 500 hours using a quartz glass mercury lamp of 750 W in accordance with JIS R3205, it is possible to enhance the light resistance of the resulting laminated glass. It is preferred that the two sheets of clear glass used for the laminated glass be two sheets of transparent float plate glass with a thickness of 2.5 mm. Moreover, it is preferred that the interlayer film for laminated glass used for the Laminated glass C be an interlayer film for laminated glass with a thickness of 0.76 mm. In particular, in the case where the ratio L's/Ls of the relative scotopic vision luminance L's to the relative photopic vision luminance Ls of the laminated glass is greater than 1.0, by allowing the ΔA−Y to lie within the above preferred range, it is possible to obtain an interlayer film for laminated glass further excellent in visibility in a dark place and anti-glare property in addition to the light resistance. It is more preferred that the absolute value of the difference in visible light transmittance ΔA−Y be less than or equal to 0.7, and it is further preferred that the absolute value thereof be less than or equal to 0.5. The below-mentioned A−Y before irradiated with ultraviolet rays refers to the initial A−Y.

The difference in visible light transmittance Δ$A-Y$=
($A-Y$ after irradiated with ultraviolet rays)−
($A-Y$ before irradiated with ultraviolet rays)

(Thermoplastic Resin)

The thermoplastic resin included in the interlayer film for laminated glass according to the present invention is not particularly limited. As the thermoplastic resin, a conventionally known thermoplastic resin can be used. One kind of the thermoplastic resin may be used alone, and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of the interlayer film for laminated glass according to the present invention to a laminated glass member or another interlayer film is further heightened.

For example, the polyvinyl acetal resin can be produced by acetalizing polyvinyl alcohol with an aldehyde. For example, the polyvinyl alcohol can be produced by saponifying polyvinyl acetate. The saponification degree of the polyvinyl alcohol generally lies within the range of 70 to 99.8% by mole.

The average polymerization degree of the polyvinyl alcohol is preferably greater than or equal to 200, more preferably greater than or equal to 500, preferably less than or equal to 3500, more preferably less than or equal to 3000, and further preferably less than or equal to 2500. When the average polymerization degree is greater than or equal to the above lower limit, the penetration resistance of laminated glass is further enhanced. When the average polymerization degree is less than or equal to the above upper limit, the resin is easily formed into an interlayer film.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin be 3 or 4. When the number of carbon atoms of the acetal group in the polyvinyl acetal resin is greater than or equal to 3, the glass transition temperature of the interlayer film is sufficiently lowered.

The aldehyde is not particularly limited. In general, as the aldehyde, an aldehyde with 1 to 10 carbon atoms is suitably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Of these, propionaldehyde, n-butyraldehyde, isobutyraldehyde, n-hexylaldehyde or n-valeraldehyde is preferred, propionaldehyde, n-butyraldehyde or isobutyraldehyde is more preferred, and n-butyraldehyde is further preferred. One kind of the aldehyde may be used alone, and two or more kinds thereof may be used in combination.

The content ratio of the hydroxyl group (the amount of hydroxyl groups) of the polyvinyl acetal resin is preferably greater than or equal to 15% by mole, more preferably greater than or equal to 18% by mole, preferably less than or equal to 40% by mole, and more preferably less than or equal to 35% by mole. When the content ratio of the hydroxyl group is greater than or equal to the above lower limit, the adhesive force of the interlayer film is further heightened. Moreover, when the content ratio of the hydroxyl group is less than or equal to the above upper limit, the flexibility of the interlayer film is enhanced and the handling of the interlayer film is facilitated.

The content ratio of the hydroxyl group of the polyvinyl acetal resin is a value expressing the mole fraction determined by dividing the amount of ethylene groups to which the hydroxyl group is bonded by the total amount of ethylene groups in the main chain in terms of percentage. For example, the amount of ethylene groups to which the hydroxyl group is bonded can be measured in accordance with JIS K6726 "Testing methods for polyvinyl alcohol" or in accordance with ASTM D1396-92 to be determined.

The acetylation degree (the amount of acetyl groups) of the polyvinyl acetal resin is preferably greater than or equal to 0.1% by mole, more preferably greater than or equal to 0.3% by mole, further preferably greater than or equal to 0.5% by mole, preferably less than or equal to 30% by mole, more preferably less than or equal to 25% by mole, and further preferably less than or equal to 20% by mole. When the acetylation degree is greater than or equal to the above lower limit, the compatibility between the polyvinyl acetal resin and a plasticizer is heightened. When the acetylation degree is less than or equal to the above upper limit, the moisture resistance of the interlayer film and laminated glass is enhanced.

The acetylation degree is a value expressing the mole fraction determined by dividing a value obtained by subtracting the amount of ethylene groups to which the acetal group is bonded and the amount of ethylene groups to which the hydroxyl group is bonded from the total amount of ethylene groups in the main chain by the total amount of ethylene groups in the main chain in terms of percentage. For example, the amount of ethylene groups to which the acetal group is bonded can be measured in accordance with JIS K6728 "Testing methods for polyvinyl butyral" or in accordance with ASTM D1396-92.

The acetalization degree of the polyvinyl acetal resin (the butyralization degree in the case of a polyvinyl butyral resin) is preferably greater than or equal to 60% by mole, more preferably greater than or equal to 63% by mole, preferably less than or equal to 85% by mole, more preferably less than or equal to 75% by mole, and further preferably less than or equal to 70% by mole. When the acetalization degree is greater than or equal to the above lower limit, the compatibility between the polyvinyl acetal resin and a plasticizer is heightened. When the acetalization degree is less than or equal to the above upper limit, the reaction time required for producing the polyvinyl acetal resin is shortened.

The acetalization degree is a value expressing the mole fraction determined by dividing the amount of ethylene groups to which the acetal group is bonded by the total amount of ethylene groups in the main chain in terms of percentage.

The acetalization degree can be calculated by measuring the acetylation degree and the content ratio of the hydroxyl group by a method in accordance with JIS K6728 "Testing methods for polyvinyl butyral" or a method in accordance with ASTM D1396-92, calculating the mole fraction from the measurement results obtained, and then subtracting the acetylation degree and the content ratio of the hydroxyl group from 100% by mole.

In this connection, it is preferred that the content ratio of the hydroxyl group (the amount of hydroxyl groups), the acetalization degree (the butyralization degree) and the acetylation degree be calculated from the results measured by a method in accordance with JIS K6728 "Testing methods for polyvinyl butyral". In the case where the polyvinyl acetal resin is a polyvinyl butyral resin, it is preferred that the content ratio of the hydroxyl group (the amount of hydroxyl groups), the acetalization degree (the butyralization degree) and the acetylation degree be calculated from the results measured by a method in accordance with JIS K6728 "Testing methods for polyvinyl butyral".

(Plasticizer)

From the viewpoint of further heightening the adhesive force of an interlayer film, it is preferred that the interlayer film for laminated glass according to the present invention include a plasticizer. In the case where the thermoplastic resin included in an interlayer film is a polyvinyl acetal resin, it is especially preferred that the interlayer film include a plasticizer.

The plasticizer is not particularly limited. As the plasticizer, a conventionally known plasticizer can be used. One kind of the plasticizer may be used alone, and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Of these, organic ester plasticizers are preferred. It is preferred that the plasticizer be a liquid plasticizer.

The monobasic organic acid ester is not particularly limited and examples thereof include a glycol ester obtained by the reaction of a glycol with a monobasic organic acid, an ester of triethylene glycol or tripropylene glycol and a monobasic organic acid, and the like. Examples of the glycol include triethylene glycol, tetraethylene glycol, tripropylene glycol and the like. Examples of the monobasic organic acid include butyric acid, isobutyric acid, caproic acid, 2-ethylbutyric acid, hepthylic acid, n-octylic acid, 2-ethylhexanoic acid, n-nonylic acid, decylic acid and the like.

The polybasic organic acid ester is not particularly limited and examples thereof include an ester compound of a polybasic organic acid and an alcohol having a linear or branched structure of 4 to 8 carbon atoms. Examples of the polybasic organic acid include adipic acid, sebacic acid, azelaic acid and the like.

The organic ester plasticizer is not particularly limited and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicapryate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyd, a mixture of a phosphoric acid ester and an adipic acid ester, and the like. Organic ester plasticizers other than these may be used.

The organic phosphate plasticizer is not particularly limited and examples thereof include tributoxyethyl phosphate, isodecyl phenyl phosphate, triisopropyl phosphate and the like.

It is preferred that the plasticizer be a diester plasticizer represented by the following formula (1).

[Chemical 1]

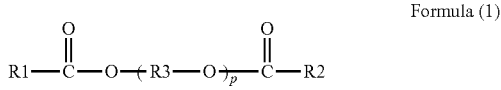

Formula (1)

In the foregoing formula (1), R1 and R2 each represent an organic group with 5 to 10 carbon atoms, R3 represents an ethylene group, an isopropylene group or an n-propylene group, and p represents an integer of 3 to 10. It is preferred that R1 and R2 in the foregoing formula (1) each be an organic group with 6 to 10 carbon atoms.

It is preferred that the plasticizer include at least one kind among triethylene glycol di-2-ethylhexanoate (3GO) and triethylene glycol di-2-ethylbutyrate (3GH), and it is more preferred that the plasticizer include triethylene glycol di-2-ethylhexanoate.

The content of the plasticizer is not particularly limited. The content of the plasticizer is preferably greater than or equal to 25 parts by weight, more preferably greater than or equal to 30 parts by weight, preferably less than or equal to 60 parts by weight and more preferably less than or equal to 50 parts by weight, relative to 100 parts by weight of the thermoplastic resin. When the content of the plasticizer is greater than or equal to the above lower limit, the penetration resistance of laminated glass is further enhanced. When the content of the plasticizer is less than or equal to the above upper limit, the transparency of the interlayer film is further enhanced.

(Ingredient X)

It is preferred that the interlayer film for laminated glass according to the present invention include the Ingredient X. The Ingredient X is at least one kind of ingredient among a phthalocyanine compound with a maximum absorption wavelength greater than or equal to 550 nm and less than or equal to 750 nm, a naphthalocyanine compound with a maximum absorption wavelength greater than or equal to 550 nm and less than or equal to 750 nm, an anthracyanine compound with a maximum absorption wavelength greater than or equal to 550 nm and less than or equal to 750 nm and an indanthrene compound with a maximum absorption wavelength greater than or equal to 550 nm and less than or equal to 750 nm. One kind of the Ingredient X may be used alone, and two or more kinds thereof may be used in combination. Of these, since the further enhanced anti-glare property and light resistance are attained, it is preferred that the interlayer film for laminated glass according to the present invention include at least one kind of ingredient among a phthalocyanine compound with a maximum absorption wavelength greater than or equal to 550 nm and less than or equal to 750 nm, a naphthalocyanine compound with a maximum absorption wavelength greater than or equal to 550 nm and less than or equal to 750 nm and an anthracyanine compound with a maximum absorption wavelength greater than or equal to 550 nm and less than or equal to 750 nm as the Ingredient X, and it is more preferred that the interlayer film for laminated glass include a phthalocyanine compound with a maximum absorption wavelength greater than or equal to 550 nm and less than or equal to 750 nm.

In order to effectively obtain the effects of 1) high anti-glare property, 2) high light resistance and 3) high visibility in a dark place in combination, it is preferred that the maximum absorption wavelength of the Ingredient X be greater than or equal to the above lower limit and less than or equal to the above upper limit.

Examples of the Ingredient X include phthalocyanine, a derivative of phthalocyanine, naphthalocyanine, a derivative of naphthalocyanine, anthracyanine, a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

From the viewpoint of further heightening the heat shielding properties of the interlayer film and laminated glass, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoint of further satisfactorily obtaining the effects of the above-mentioned 1), 2) and 3), it is preferred that the Ingredient X contain vanadium atoms or copper atoms, and it is more preferred that the Ingredient X contain copper atoms. The Ingredient X may contain vanadium atoms. It is more preferred that the Ingredient X be at least one kind among phthalocyanine containing vanadium atoms or copper atoms and a derivative of phthalocyanine containing vanadium atoms or copper atoms, and it is more preferred that the Ingredient X be at least one kind among phthalocyanine containing copper atoms and a derivative of phthalocyanine containing copper atoms. From the viewpoint of still further heightening the heat shielding properties of the interlayer film and laminated glass, it is preferred that the Ingredient X have a structural unit in which an oxygen atom is bonded to a copper atom.

The content of the Ingredient X in the interlayer film is not particularly limited. In 100% by weight of the interlayer film, the content of the Ingredient X is preferably greater than or equal to 0.000001% by weight, more preferably greater than or equal to 0.00001% by weight, further preferably greater than or equal to 0.001% by weight, especially preferably greater than or equal to 0.002% by weight, preferably less than or equal to 0.05% by weight, more preferably less than or equal to 0.03% by weight, and further preferably less than or equal to 0.01% by weight.

The content of the Ingredient X in the interlayer film is preferably greater than or equal to 0.0000014 parts by weight, more preferably greater than or equal to 0.000014 parts by weight, further preferably greater than or equal to 0.0010 parts by weight, especially preferably greater than or equal to 0.0014 parts by weight, preferably less than or equal to 0.07 parts by weight, more preferably less than or equal to 0.05 parts by weight, and further preferably less than or equal to 0.014 parts by weight, relative to 100 parts by weight of the thermoplastic resin.

When the content of the Ingredient X in the interlayer film is greater than or equal to the above lower limit and less than or equal to the above upper limit, effects of the above-mentioned 1), 2) and 3) are further satisfactorily obtained. Moreover, with regard to the color tone, it is possible to attain a color tone which is preferable as that of laminated glass.

(Ingredient Y Similar to Ingredient X)

The interlayer film for laminated glass according to the present invention may include Ingredient Y similar to the Ingredient X. Examples of the Ingredient Y include a derivative of tetraazaporphyrin, a derivative of anthraquinone, and the like.

The content of the Ingredient Y in the interlayer film is not particularly limited. In 100% by weight of the interlayer film, the content of the Ingredient Y is preferably greater than or equal to 0.000001% by weight, more preferably greater than or equal to 0.00001% by weight, further preferably greater than or equal to 0.001% by weight, especially preferably greater than or equal to 0.002% by weight, preferably less than or equal to 0.05% by weight, more preferably less than or equal to 0.03% by weight, and further preferably less than or equal to 0.01% by weight.

The content of the Ingredient Y in the interlayer film is preferably greater than or equal to 0.0000014 parts by weight, more preferably greater than or equal to 0.000014 parts by weight, further preferably greater than or equal to 0.0010 parts by weight, especially preferably greater than or equal to 0.0014 parts by weight, preferably less than or equal to 0.07 parts by weight, more preferably less than or equal to 0.05 parts by weight, and further preferably less than or equal to 0.014 parts by weight, relative to 100 parts by weight of the thermoplastic resin.

When the content of the Ingredient Y in the interlayer film is greater than or equal to the above lower limit and less than or equal to the above upper limit, effects of the above-mentioned 1) and 2) are further satisfactorily obtained.

(Metal Salt)

It is preferred that the interlayer film for laminated glass according to the present invention include at least one kind of metal salt (hereinafter, sometimes described as Metal salt M) among an alkali metal salt and an alkaline earth metal salt. By the use of the Metal salt M, controlling the adhesivity between a laminated glass member and the interlayer film or the adhesivity between respective layers in the interlayer film is facilitated. Furthermore, by allowing the interlayer film to include the Metal salt M together with the thermoplastic resin and the Ingredient X, it is possible to further enhance the above-mentioned 2) light resistance. This was found by the present inventors. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt included in the interlayer film contain at least one kind of metal among K and Mg.

Moreover, it is more preferred that the Metal salt M be an alkali metal salt of an organic acid with 2 to 16 carbon atoms or an alkaline earth metal salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

In the case where the interlayer film includes Metal salt M, the content of Metal salt M is preferably greater than or equal to 5 ppm, more preferably greater than or equal to 10 ppm, further preferably greater than or equal to 20 ppm, preferably less than or equal to 300 ppm, more preferably less than or equal to 250 ppm, and further preferably less than or equal to 200 ppm, in terms of the metal element concentration. When the content of Metal salt M is greater than or equal to the above lower limit and less than or equal to the above upper limit, the adhesivity between a laminated glass member and the interlayer film or the adhesivity between respective layers in the interlayer film can be further well controlled. Furthermore, when the content of the Metal salt M is greater than or equal to the above lower limit, the light resistance of the interlayer film is still further enhanced, and high visible light transmittance can be maintained over a further longer period of time.

(Ultraviolet Ray Shielding Agent)

It is preferred that the interlayer film for laminated glass according to the present invention include an ultraviolet ray shielding agent. By the use of an ultraviolet ray shielding agent, even when the interlayer film and the laminated glass are used for a long period of time, the light resistance is further enhanced. Even in the case where the ultraviolet ray shielding agent is not used, by using the thermoplastic resin and the Ingredient X or the Ingredient Y together, the light resistance can be enhanced as compared to the case where the Ingredient X or the Ingredient Y is not used together with the thermoplastic resin. One kind of the ultraviolet ray shielding agent may be used alone, and two or more kinds thereof may be used in combination.

Examples of the ultraviolet ray shielding agent include an ultraviolet ray absorber. It is preferred that the ultraviolet ray shielding agent be an ultraviolet ray absorber.

Examples of the ultraviolet ray shielding agent include a metal-based ultraviolet ray shielding agent, a metal oxide-based ultraviolet ray shielding agent, a benzotriazole ultraviolet ray shielding agent, a benzophenone ultraviolet ray shielding agent, a triazine ultraviolet ray shielding agent, a benzoate ultraviolet ray shielding agent, and the like.

Examples of the metal-based ultraviolet ray shielding agent include platinum particles, particles in which the surface of platinum particles is coated with silica, palladium particles, particles in which the surface of palladium particles is coated with silica, and the like. It is preferred that the ultraviolet ray shielding agent not be heat shielding particles. The ultraviolet ray shielding agent is preferably a benzotriazole ultraviolet ray shielding agent, a benzophenone ultraviolet ray shielding agent, a triazine ultraviolet ray shielding agent or a benzoate ultraviolet ray shielding agent, more preferably a benzotriazole ultraviolet ray shielding agent or a benzophenone ultraviolet ray shielding agent, and further preferably a benzotriazole ultraviolet ray shielding agent.

Examples of the metal oxide-based ultraviolet ray shielding agent include zinc oxide, titanium oxide, cerium oxide and the like. Furthermore, in the metal oxide-based ultraviolet ray shielding agent, the surface thereof may be coated. Examples of a coating material for the surface of the metal oxide-based ultraviolet ray shielding agent include an insulating metal oxide, a hydrolyzable organosilicon compound, a silicone compound and the like.

Examples of the insulating metal oxide include silica, alumina, zirconia and the like. For example, the insulating metal oxide has a band-gap energy greater than or equal to 5.0 eV.

Examples of the benzotriazole ultraviolet ray shielding agent include benzotriazole ultraviolet ray shielding agents such as 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.) and 2-(2'-hydroxy-3',5'-di-amylphenyl)benzotriazole ("Tinuvin 328" available from BASF Japan Ltd.). It is preferred that the ultraviolet ray shielding agent be a benzotriazole ultraviolet ray shielding agent containing halogen atoms, and it is more preferred that the ultraviolet ray shielding agent be a benzotriazole ultraviolet ray shielding agent containing chlorine atoms, since those are excellent in ultraviolet ray absorbing performance.

Examples of the benzophenone ultraviolet ray shielding agent include octabenzone ("Chimassorb 81" available from BASF Japan Ltd.) and the like.

Examples of the triazine ultraviolet ray shielding agent include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.) and the like.

Examples of the benzoate ultraviolet ray shielding agent include 2,4-di-tert-butylphenyl-3,5-di-tert-butyl-4-hydroxy-benzoate ("Tinuvin 120" available from BASF Japan Ltd.) and the like.

It is preferred that the interlayer film include an ultraviolet ray shielding agent having a maximum absorption wavelength on the longest wavelength side at a wavelength less than 350 nm (hereinafter, sometimes described as Ultraviolet ray shielding agent Z). By allowing the Ultraviolet ray shielding agent Z to have a maximum absorption wavelength on the longest wavelength side at a wavelength less than 350 nm, the ultraviolet ray shielding properties can be effectively enhanced and the deterioration of the Ingredient X and the Ingredient Y can be effectively suppressed. The lower limit of the maximum absorption wavelength on the longest wavelength side of the Ultraviolet ray shielding agent Z is not particularly limited as long as the function of shielding ultraviolet rays is exerted. The maximum absorption wavelength on the longest wavelength side of the Ultraviolet ray shielding agent Z is preferably greater than or equal to 250 nm and more preferably greater than or equal to 290 nm. One kind of the Ultraviolet ray shielding agent Z may be used alone, and two or more kinds thereof may be used in combination.

The maximum absorption wavelength can be measured with a liquid containing 0.01% by weight of an ultraviolet ray shielding agent and 99.9% by weight of triethylene glycol di-2-ethylhexanoate, and for example, using a quartz cell (1 mm in cell length).

From the viewpoints of enhancing the ultraviolet ray shielding properties and further enhancing the light resistance, it is preferred that the Ultraviolet ray shielding agent Z contain a benzotriazole compound, a benzophenone compound, a triazine compound, a malonic acid ester compound or an oxanilide compound, and it is more preferred that the Ultraviolet ray shielding agent Z contain a triazine compound or a malonic acid ester compound. The Ultraviolet ray shielding agent Z preferably contains a benzotriazole compound, preferably contains a benzophenone compound, preferably contains a triazine compound, preferably contains a malonic acid ester compound, and preferably contains an oxanilide compound.

From the viewpoint of further enhancing the light resistance of the interlayer film and laminated glass, it is more preferred that the Ultraviolet ray shielding agent Z contain "LA-F70" available from ADEKA CORPORATION, 2-ethyl-2'-ethoxy-oxyanilide ("Sanduvor VSU" available from Clariant (Japan) K.K.), malonic acid[(4-methoxyphenyl)-methylene]-dimethyl ester ("Hostavin PR-25" available from Clariant (Japan) K.K.), or 2-[2-hydroxy-4-[(octyloxycarbonyl)ethylideneoxy]phenyl-4,6-di(4-phenyl)phenyl-1,3,5-triazine ("Tinuvin 479" available from BASF Japan Ltd.), and it is more preferred that the Ultraviolet ray shielding agent Z contain "LA-F70" available from ADEKA CORPORATION or malonic acid[(4-methoxyphenyl)-methylene]-dimethyl ester. The Ultraviolet ray shielding agent Z preferably contains "LA-F70" available from ADEKA CORPORATION, preferably contains 2-ethyl-2'-ethoxy-oxyanilide, preferably contains malonic acid[(4-methoxyphenyl)-methylene]-dimethyl ester, and preferably contains 2-[2-hydroxy-4-[(octyloxycarbonyl)ethylideneoxy]phenyl-4,6-di(4-phenyl)phenyl-1,3,5-triazine.

From the viewpoints of enhancing the ultraviolet ray shielding properties and still further enhancing the light resistance, it is preferred that the interlayer film include a triazine compound and a malonic acid ester compound, it is more preferred that the interlayer film include "LA-F70" available from ADEKA CORPORATION and a malonic acid ester compound, and it is further preferred that the interlayer film include "LA-F70" available from ADEKA CORPORATION and malonic acid[(4-methoxyphenyl)-methylene]-dimethyl ester.

The content of the ultraviolet ray shielding agent in the interlayer film is not particularly limited. From the viewpoint of further enhancing the light resistance, the content of the ultraviolet ray shielding agent is preferably greater than or equal to 0.1% by weight, more preferably greater than or equal to 0.2% by weight, further preferably greater than or equal to 0.3% by weight, especially preferably greater than or equal to 0.5% by weight, preferably less than or equal to 2.5% by weight, more preferably less than or equal to 2% by weight, further preferably less than or equal to 1% by weight, and especially preferably less than or equal to 0.8% by weight, in 100% by weight of the interlayer film. In particular, by allowing the content of the ultraviolet ray shielding agent to be greater than or equal to 0.2% by weight in 100% by weight of the interlayer film, the lowering in visible light transmittance of the interlayer film and laminated glass after the lapse of a certain period of time can be significantly suppressed.

From the viewpoint of further enhancing the light resistance, the content of the ultraviolet ray shielding agent in the interlayer film is preferably greater than or equal to 0.14 parts by weight, more preferably greater than or equal to 0.2 parts by weight, further preferably greater than or equal to 0.5 parts by weight, especially preferably greater than or equal to 0.7 parts by weight, preferably less than or equal to 3.5 parts by weight, more preferably less than or equal to 3 parts by weight, further preferably less than or equal to 1.4 parts by weight, and especially preferably less than or equal to 1.0 part by weight, relative to 100 parts by weight of the thermoplastic resin. In particular, by allowing the content of the ultraviolet ray shielding agent to be greater than or equal to 0.14 parts by weight relative to 100 parts by weight of the thermoplastic resin, the lowering in visible light transmittance of the interlayer film and laminated glass after the lapse of a certain period of time can be significantly suppressed.

From the viewpoint of further enhancing the light resistance, the content of the Ultraviolet ray shielding agent Z is preferably greater than or equal to 0.1% by weight, more preferably greater than or equal to 0.2% by weight, further preferably greater than or equal to 0.3% by weight, especially preferably greater than or equal to 0.5% by weight, preferably less than or equal to 2.5% by weight, more preferably less than or equal to 2% by weight, further preferably less than or equal to 1% by weight, and especially preferably less than or equal to 0.8% by weight, in 100% by weight of the interlayer film. From the viewpoint of further enhancing the light resistance, the content of the Ultraviolet ray shielding agent Z in the interlayer film is preferably greater than or equal to 0.14 parts by weight, more preferably greater than or equal to 0.2 parts by weight, further preferably greater than or equal to 0.5 parts by weight, especially preferably greater than or equal to 0.7 parts by weight, preferably less than or equal to 3.5 parts by weight, more preferably less than or equal to 3 parts by weight, further preferably less than or equal to 1.4 parts by weight, and especially preferably less than or equal to 1.0 part by weight, relative to 100 parts by weight of the thermoplastic resin.

(Oxidation Inhibitor)

It is preferred that the interlayer film for laminated glass according to the present invention include an oxidation inhibitor. One kind of the oxidation inhibitor may be used alone, and two or more kinds thereof may be used in combination.

Examples of the oxidation inhibitor include a phenol oxidation inhibitor, a sulfur oxidation inhibitor, a phosphorus oxidation inhibitor and the like. The phenol oxidation inhibitor is an oxidation inhibitor having a phenol skeleton. The sulfur oxidation inhibitor is an oxidation inhibitor containing a sulfur atom. The phosphorus oxidation inhibitor is an oxidation inhibitor containing a phosphorus atom.

It is preferred that the oxidation inhibitor be a phenol oxidation inhibitor or a phosphorus oxidation inhibitor.

Examples of the phenol oxidation inhibitor include 2,6-di-t-butyl-p-cresol (BHT), butylated hydroxyanisole (BHA), 2,6-di-t-butyl-4-ethylphenol, stearyl-β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus oxidation inhibitor include tridecyl phosphite, tris(tridecyl)phosphite, triphenyl phosphite, trinonylphenyl phosphite, bis(tridecyl)pentaerithritol diphosphite, bis(decyl)pentaerithritol diphosphite, tris(2,4-di-t-butylphenyl)phosphite, bis(2,4-di-t-butyl-6-methylphenyl)ethyl ester phosphorous acid, tris(2,4-di-t-butylphenyl) phosphite, 2,2'-methylenebis(4,6-di-t-butyl-1-phenyloxy)(2-ethylhexyloxy)phosphorus, and the like. One kind or two or more kinds among these oxidation inhibitors are suitably used.

Examples of a commercial product of the oxidation inhibitor include "Smilizer BHT" available from Sumitomo Chemical Co., Ltd., "Irganox 1010" available from Nihon Ciba-Geigy K.K., and the like.

In order to enhance the light resistance of the interlayer film and laminated glass, it is preferred that the content of the oxidation inhibitor be greater than or equal to 0.1% by weight in 100% by weight of the interlayer film. Moreover, since an effect commensurate with the addition of an oxidation inhibitor is not attained, it is preferred that the content of the oxidation inhibitor be less than or equal to 2% by weight in 100% by weight of the interlayer film.

From the viewpoint of further enhancing the light resistance of the interlayer film and laminated glass, the content of the oxidation inhibitor is preferably greater than or equal to 0.1% by weight in 100% by weight of the interlayer film. Moreover, in order to suppress the discoloration of the peripheral part due to the influence of the oxidation inhibitor, the content of the oxidation inhibitor is preferably less than or equal to 2% by weight, and more preferably less than or equal to 1.8% by weight, in 100% by weight of the interlayer film. From the viewpoint of further enhancing the light resistance of the interlayer film and laminated glass, the content of the oxidation inhibitor in the interlayer film is preferably greater than or equal to 0.14 parts by weight relative to 100 parts by weight of the thermoplastic resin. Moreover, in order to suppress the discoloration of the peripheral part due to the influence of the oxidation inhibitor, the content of the oxidation inhibitor is preferably less than or equal to 3 parts by weight, and more preferably less than or equal to 1.3 parts by weight, relative to 100 parts by weight of the thermoplastic resin.

(Other Ingredients)

The interlayer film for laminated glass according to the present invention may include additives such as a light stabilizer, a flame retardant, an antistatic agent, a pigment, a dye, an adhesive force regulating agent, a moisture-resistance improving agent, a fluorescent brightening agent and an infrared ray absorber, as necessary. One kind of these additives may be used alone, and two or more kinds thereof may be used in combination.

(Interlayer Film for Laminated Glass)

The thickness of the interlayer film for laminated glass according to the present invention is not particularly limited. From the viewpoint of the practical aspect and the viewpoint of sufficiently heightening the heat shielding properties, the thickness of the interlayer film is preferably greater than or equal to 0.1 mm, more preferably greater than or equal to 0.25 mm, preferably less than or equal to 3 mm, and more preferably less than or equal to 1.5 mm. When the thickness of the interlayer film is greater than or equal to the above lower limit, the penetration resistance of laminated glass is enhanced.

The production method of the interlayer film for laminated glass according to the present invention is not particularly limited. As the production method of the interlayer film, a conventionally known method can be used. Examples thereof include a production method of kneading a thermoplastic resin and other ingredients blended as necessary such as the Ingredient X and forming the kneaded product into an interlayer film, and the like. A production method of extrusion-molding is preferred because the method is suitable for continuous production.

The method for kneading is not particularly limited. Examples of this method include a method using an extruder, a plastograph, a kneader, a banbury mixer, a calender roll, or the like. Of these, a method using an extruder is preferred and a method using a twin screw extruder is more preferred because the methods are suitable for continuous production.

(Laminated Glass)

FIG. 1 shows an example of laminated glass prepared with an interlayer film for laminated glass in accordance with one embodiment of the present invention represented as a sectional view.

Laminated glass 1 shown in FIG. 1 is provided with an interlayer film 2, a first laminated glass member 21 and a second laminated glass member 22. The interlayer film 2 is a single-layered interlayer film. The interlayer film 2 is used for obtaining laminated glass. The interlayer film 2 is an interlayer film for laminated glass.

The interlayer film 2 is arranged between the first and second laminated glass members 21, 22 to be sandwiched. The first laminated glass member 21 is layered on a first surface 2a (one surface) of the interlayer film 2. The second laminated glass member 22 is layered on a second surface 2b (the other surface) opposite to the first surface 2a of the interlayer film 2.

FIG. 2 shows a modified example of laminated glass prepared with an interlayer film for laminated glass in accordance with one embodiment of the present invention represented as a sectional view.

Laminated glass 11 shown in FIG. 2 is provided with an interlayer film 12, a first laminated glass member 21 and a second laminated glass member 22. The interlayer film 12 is a multi-layered interlayer film. The interlayer film 12 is used for obtaining laminated glass. The interlayer film 12 is an interlayer film for laminated glass.

The interlayer film 12 has a structure in which three interlayer films of a first layer 13 (an interlayer film), a second layer 14 (an interlayer film) and a third layer 15 (an interlayer film) are layered in this order. In the present embodiment, the second layer 14 is a sound insulating layer. As the second layer 14, the interlayer film in accordance with one embodiment of the present invention is used. The first and third layers 13, 15 are protective layers. The first and third layers 13, 15 may also be interlayer films in accordance with the embodiment of the present invention.

The interlayer film 12 is arranged between the first and second laminated glass members 21, 22 to be sandwiched. The second layer 14 (an interlayer film) is interposed between the first and third layers 13, 15 to be arranged between the first and second laminated glass members 21, 22. The first laminated glass member 21 is layered on an outer surface 13a of the first layer 13. The second laminated glass member 22 is layered on an outer surface 15a of the second layer 15.

As described above, the laminated glass according to the present invention is provided with a first laminated glass member, a second laminated glass member and an interlayer film for laminated glass according to the present invention, and the interlayer film for laminated glass is arranged between the first and second laminated glass members. The laminated glass may be provided with only the interlayer film for laminated glass according to the present invention, as the interlayer film, and may be provided with the interlayer film for laminated glass according to the present invention and another interlayer film for laminated glass. The laminated glass includes at least the interlayer film for laminated glass according to the present invention.

Examples of the first and second laminated glass members include a glass plate and a PET (polyethylene terephthalate) film and the like. As the laminated glass, laminated glass in which an interlayer film is sandwiched between a glass plate and a PET film or the like, as well as laminated glass in which an interlayer film is sandwiched between two glass plates, is included. Laminated glass is a laminate provided with a glass plate, and it is preferred that at least one glass plate be used. It is preferred that each of the first and second laminated glass members be a glass plate or a PET film and at least one among the first and second laminated glass members be a glass plate.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, net-reinforced plate glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

The thickness of each of the first and second laminated glass members is preferably greater than or equal to 1 mm, preferably less than or equal to 5 mm, and more preferably less than or equal to 3 mm. Moreover, in the case where the laminated glass member is a glass plate, the thickness of the glass plate is preferably greater than or equal to 1 mm, preferably less than or equal to 5 mm, and more preferably less than or equal to 3 mm. In the case where the laminated glass member is a PET film, the thickness of the PET film is preferably greater than or equal to 0.03 mm and preferably less than or equal to 0.5 mm.

The production method of the laminated glass is not particularly limited. For example, an interlayer film is sandwiched between first and second laminated glass members, and the air remaining between each of the first and second laminated glass members and the interlayer film is removed by allowing the members to pass through a pressing roll or by putting the members into a rubber bag and allowing the contents to be sucked under reduced pressure. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The interlayer film and the laminated glass can be used for automobiles, railway vehicles, aircraft, ships, buildings and the like. The interlayer film and the laminated glass can also be used for applications other than these applications. It is preferred that the interlayer film and the laminated glass be an interlayer film and laminated glass for vehicles or for construction, and it is more preferred that the interlayer film and the laminated glass be an interlayer film and laminated glass for vehicles. The interlayer film and the laminated glass can be used for a windshield, side glass, rear glass or roof glass of an automobile and the like. The interlayer film and the laminated glass are suitably used especially for a windshield since they are excellent in anti-glare property.

Hereinafter, the present invention will be described in more detail with reference to examples. The present invention is not limited only to these examples.

The following materials were used in examples and comparative examples.

Thermoplastic Resin:

PVB1 (a polyvinyl butyral resin acetalized with n-butyl aldehyde, the average polymerization degree of 1700, the content ratio of the hydroxyl group of 30.8% by mole, the acetylation degree of 0.7% by mole, the butyralization degree of 68.5% by mole)

In this connection, the content ratio of the hydroxyl group, the acetylation degree and the butyralization degree (the acetalization degree) of the polyvinyl butyral resin were measured by a method in accordance with ASTM D1396-92. In this connection, even in the cases of being measured according to JIS K6728 "Testing methods for polyvinyl butyral", numerical values similar to those obtained by a method in accordance with ASTM D1396-92 were exhibited.

Plasticizer:

3GO (Triethylene Glycol Di-2-Ethylhexanoate)

Ingredient X:

SG-5A1257 (a copper phthalocyanine compound, "BLUE SG-5A1257" available from SUMIKA COLOR CO., LTD., the maximum absorption wavelength of 715 nm, an absorption wavelength peak is also observed at a wavelength of 620 nm)

SG-4A1053 (a copper phthalocyanine compound, "GREEN SG-4A1053" available from SUMIKA COLOR CO., LTD., the maximum absorption wavelength of 620 nm)

SG-531 (an indanthrene compound, "BLUE SG-531" available from SUMIKA COLOR CO., LTD., the maximum absorption wavelength of 640 nm)

Ingredient Y Similar to Ingredient X:

TAP-45 (a tetraazaporphyrin compound, "TAP-45" available from YAMADA CHEMICAL CO., LTD., the maximum absorption wavelength of 585 nm)

SG-1505 (an anthraquinone compound, "BLUE SG-1505" available from SUMIKA COLOR CO., LTD., the maximum absorption wavelength of 645 nm, an absorption wavelength peak is also observed at a wavelength of 595 nm)

SG-1650 (an anthraquinone compound, "VIOLET SG-1650" available from SUMIKA COLOR CO., LTD., the maximum absorption wavelength of 565 nm, an absorption wavelength peak is also observed at a wavelength of 605 nm)

SG-100 (a perylene compound, "RED SG-100" available from SUMIKA COLOR CO., LTD., the maximum absorption wavelength of 475 nm)

Metal Salt M:

A mixture of Mg salts (a mixture of Mg salts of 50% by weight of magnesium acetate and 50% by weight of magnesium 2-ethylbutyrate)

Ultraviolet Ray Shielding Agent:

Tinuvin 326 (2-(2'-hydroxy-3'-t-butyl-5-methylphenyl)-5-chlorobenzotriazole, "Tinuvin 326" available from BASF Japan Ltd.)

Oxidation Inhibitor:

H-BHT (2,6-di-t-butyl-4-methylphenol, "H-BHT" available from Sakai Chemical Industry Co., Ltd.)

EXAMPLE 1

Preparation of Interlayer Film

To 100 parts by weight of a polyvinyl butyral resin (PVB1), 40 parts by weight of triethylene glycol di-2-ethylhexanoate (3GO), 0.0028 parts by weight, as the amount of the coloring ingredient (Ingredient X), of SG-5A1257 (a copper phthalocyanine compound, "BLUE SG-5A1257" available from SUMIKA COLOR CO., LTD.), a mixture of Mg salts (a mixture of Mg salts of 50% by weight of magnesium acetate and 50% by weight of magnesium 2-ethylbutyrate) in an amount that the magnesium content in the resulting interlayer film becomes 160 ppm, 0.2 parts by weight of Tinuvin 326 (2-(2'-hydroxy-3'-t-butyl-5-methylphenyl)-5-chlorobenzotriazole, "Tinuvin 326" available from BASF Japan Ltd.) and 0.2 parts by weight of H-BHT (2,6-di-t-butyl-4-methylphenol, "H-BHT" available from Sakai Chemical Industry Co., Ltd.) were added and thoroughly kneaded with a mixing roll to obtain a composition.

The composition obtained was extruded by an extruder to obtain a single-layered interlayer film (0.76 mm in thickness).

Preparation of Laminated Glass:

The interlayer film obtained (0.76 mm in thickness) was interposed between two sheets of transparent float plate glass (2.5 mm in thickness) as clear glass in accordance with JIS R3202 (1996) and fixed by means of a heat resistant tape so as not to positionally shift to obtain a laminate.

The laminate obtained was installed in a vacuum bag, and the inside of the vacuum bag was degassed at a degree of vacuum of 933.2 hPa and at ordinary temperature (23° C.) Subsequently, the temperature in the vacuum bag was elevated to 100° C. while maintaining the degassed state, and after the temperature reached 100° C., the laminate was held for 20 minutes. Afterward, the vacuum bag was allowed to spontaneously cool, and it was confirmed that the temperature was lowered to 30° C., after which the pressure was released to the atmosphere.

The laminated glass preliminarily press-bonded by the above-mentioned vacuum bag method was press-bonded for 20 minutes under conditions of 135° C. and a pressure of 1.2 MPa using an autoclave to obtain a sheet of laminated glass.

In this connection, in order to perform evaluation tests shown below, a sheet of laminated glass with a size of 300 mm×300 mm and a sheet of laminated glass with a size of 50 mm×50 mm were prepared.

EXAMPLES 2 to 12 and COMPARATIVE EXAMPLES 1 to 8

A single-layered interlayer film was prepared in the same manner as that in Example 1 except that the kind of ingredients to be blended and the content thereof were set to those listed in the following Table 2. Using the interlayer film obtained, a sheet of laminated glass provided with the interlayer film was prepared in the same manner as that in Example 1.

(Evaluation)

(1) Measurement Method of Maximum Absorption Wavelength

With 100 parts by weight of chloroform, 0.002 parts by weight (the content of the coloring ingredient (the content of Ingredient X or Ingredient Y similar to Ingredient X in the product)) of Ingredient X or Ingredient Y similar to Ingredient X was mixed to obtain a chloroform solution. The chloroform solution obtained was placed in a quartz cell for a spectrophotometer with an optical path length of 1.0 mm. Using a self-registering spectrophotometer ("U-4100" available from Hitachi, Ltd.), the transmittance at 300 to 2500 nm was measured to determine the maximum absorption wavelength. The measured values are described in the column of the above-mentioned materials.

(2) Visible Light Transmittance (A Light Y Value, Initial A-Y (380 to 780 nm))

The sheet of laminated glass with a size of 50 mm×50 mm was measured for the transmittance in the wavelength range of 300 to 2500 nm using a self-registering spectrophotometer ("U-4100" available from Hitachi, Ltd.) to calculate the visible light transmittance at 380 to 780 nm in accordance with JIS R3211 (1998).

(3) Anti-Glare Property

A sheet of laminated glass with a size of 300 mm×300 mm was arranged at a distance of 500 mm from the face of an examinee so that the line of sight is orthogonal to the plane of the laminated glass. In this state, by allowing the examinee to observe a light source at a distance of 25 m from the examinee for 5 seconds, the anti-glare property was evaluated. As the above-mentioned light source, a high pressure mercury lamp ("S-LIGHT SA160" available from NIPPON GIJUTSU CENTER Co., LTD.) was used. With regard to the criteria for judgment, a nine-point scale shown in the following Table 1, which was suggested by De Boer, was used and an average value of evaluated values obtained from 10 examinees was defined as the test result. In this connection, the above-mentioned measurement was performed in a dark room.

TABLE 1

| Visual responsiveness | Evaluation |
|---|---|
| unnoticeable | 9 |
|  | 8 |
| satisfactory | 7 |
|  | 6 |
| just admissible | 5 |
|  | 4 |
| disturbing | 3 |
|  | 2 |
| unbearable | 1 |

(4) Light Resistance

A sheet of laminated glass with a size of 300 mm×300 mm was irradiated with ultraviolet rays (quartz glass mercury lamp (750 W)) for 500 hours and 1000 hours in accordance with JIS R3205 using an ultraviolet-ray irradiation device ("HLG-2S" available from Suga Test Instruments Co., Ltd.). The sheet of laminated glass after irradiated for 500 hours and 1000 hours was measured for the A-Y in the same manner as that for the evaluation of the above-mentioned (2) Visible light transmittance. From the measured values obtained, ΔA-Y ((A-Y after irradiated with ultraviolet rays)-(initial A-Y)) was determined. In this connection, the smaller the absolute value of ΔA-Y is, the more excellent in light resistance the sheet of laminated glass is.

(5) Visibility in Dark Place (Relative Scotopic Vision Luminance L's and Relative Photopic Vision Luminance Ls)

Using a spectroradiometer ("SR-3AR" available from TOPCON TECHNOHOUSE CORPORATION) and a high pressure mercury lamp ("S-LIGHT SA160" available from NIPPON GIJUTSU CENTER Co., LTD.) as a light source, the scotopic vision luminance L' and photopic vision luminance L of a sheet of laminated glass with a size of 300 mm×300 mm were measured. At the time of measurement, a sheet of laminated glass was arranged at a distance of 500 mm from the light receiving part of the spectroradiometer in the light receiving direction so that the plane of the laminated glass is orthogonal to the light receiving direction of the spectroradiometer, and the above-mentioned light source was arranged at a distance of 3500 mm from the light receiving part of the spectroradiometer in the light receiving direction. Next, the scotopic vision luminance $L'_0$ and photopic vision luminance $L_0$ were measured in the same manner as that for the measurement of the scotopic vision luminance L' and photopic vision luminance L except that a sheet of laminated glass is not arranged. In this connection, the above-mentioned measurement was performed under an environment where the photopic vision luminance becomes less than or equal to 0.015 Cd/m$^2$ in the case of not allowing a sheet of laminated glass to be arranged and not allowing the light source to be lighted on.

In this connection, for the calculation of the scotopic vision luminance L', photopic vision luminance L, scotopic vision luminance $L'_0$ and photopic vision luminance $L_0$, the CIE standard spectral luminous efficiency was used. From the obtained scotopic vision luminance L', photopic vision luminance L, scotopic vision luminance $L'_0$ and photopic vision luminance $L_0$, the relative scotopic vision luminance L's and relative photopic vision luminance Ls were calculated according to the following equations. The higher the L'/Ls is, the more excellent in anti-glare property and visibility in a dark place the sheet of laminated glass is.

Relative scotopic vision luminance $L's$=100×(scotopic vision luminance $L'$)/(scotopic vision luminance $L'_0$)

Relative photopic vision luminance $Ls$=100×(photopic vision luminance $L$)/(photopic vision luminance $L_0$)

The configuration of the interlayer film is shown in the following Table 2 and the measurement results are shown in the following Table 3. In this connection, the photopic vision luminance and scotopic vision luminance in Table 3 refer to the photopic vision luminance L and scotopic vision luminance L', respectively.

TABLE 2

| | Composition of interlayer film | | | | | | | | |
|---|---|---|---|---|---|---|---|---|---|
| | Thermoplastic resin | | Plasticizer | | Ultraviolet ray shielding agent | | Oxidation inhibitor | | |
| | Kind | Blending amount Parts by weight | Kind | Blending amount Parts by weight | Kind | Blending amount Parts by weight | Kind | Blending amount Parts by weight | Metal salt M Kind |
| Ex. 1 | PVB1 | 100 | 3GO | 40 | Tinuvin326 | 0.2 | H-BHT | 0.2 | Mg salt |
| Ex. 2 | PVB1 | 100 | 3GO | 40 | Tinuvin326 | 0.2 | H-BHT | 0.2 | Mg salt |
| Ex. 3 | PVB1 | 100 | 3GO | 40 | Tinuvin326 | 0.2 | H-BHT | 0.2 | Mg salt |
| Ex. 4 | PVB1 | 100 | 3GO | 40 | Tinuvin326 | 0.2 | H-BHT | 0.2 | — |
| Ex. 5 | PVB1 | 100 | 3GO | 40 | Tinuvin326 | 0.2 | H-BHT | 0.2 | Mg salt |
| Ex. 6 | PVB1 | 100 | 3GO | 40 | Tinuvin326 | 0.2 | H-BHT | 0.2 | Mg salt |
| Comp. Ex. 1 | PVB1 | 100 | 3GO | 40 | Tinuvin326 | 0.2 | H-BHT | 0.2 | Mg salt |
| Comp. Ex. 2 | PVB1 | 100 | 3GO | 40 | Tinuvin326 | 0.2 | H-BHT | 0.2 | Mg salt |
| Comp. Ex. 3 | PVB1 | 100 | 3GO | 40 | Tinuvin326 | 0.2 | H-BHT | 0.2 | Mg salt |

TABLE 2-continued

| | | | | | | | | | |
|---|---|---|---|---|---|---|---|---|---|
| Comp. Ex. 4 | PVB1 | 100 | 3GO | 40 | Tinuvin326 | 0.2 | H-BHT | 0.2 | Mg salt |
| Ex. 7 | PVB1 | 100 | 3GO | 40 | Tinuvin326 | 0.2 | H-BHT | 0.2 | Mg salt |
| Ex. 8 | PVB1 | 100 | 3GO | 40 | Tinuvin326 | 0.2 | H-BHT | 0.2 | Mg salt |
| Ex. 9 | PVB1 | 100 | 3GO | 40 | Tinuvin326 | 0.2 | H-BHT | 0.2 | — |
| Ex. 10 | PVB1 | 100 | 3GO | 40 | Tinuvin326 | 0.2 | H-BHT | 0.2 | Mg salt |
| Ex. 11 | PVB1 | 100 | 3GO | 40 | Tinuvin326 | 0.2 | H-BHT | 0.2 | Mg salt |
| Ex. 12 | PVB1 | 100 | 3GO | 40 | Tinuvin326 | 0.2 | H-BHT | 0.2 | Mg salt |
| Comp. Ex. 5 | PVB1 | 100 | 3GO | 40 | Tinuvin326 | 0.2 | H-BHT | 0.2 | Mg salt |
| Comp. Ex. 6 | PVB1 | 100 | 3GO | 40 | Tinuvin326 | 0.2 | H-BHT | 0.2 | Mg salt |
| Comp. Ex. 7 | PVB1 | 100 | 3GO | 40 | Tinuvin326 | 0.2 | H-BHT | 0.2 | Mg salt |
| Comp. Ex. 8 | PVB1 | 100 | 3GO | 40 | Tinuvin326 | 0.2 | H-BHT | 0.2 | Mg salt |

| | Composition of interlayer film | | | | | |
|---|---|---|---|---|---|---|
| | | Ingredient X | | | Ingredient Y | |
| | Metal salt M Mg content in interlayer film ppm | Kind | Maximum absorption wavelength nm | Blending amount Parts by weight | Kind | Maximum absorption wavelength nm | Blending amount Parts by weight |
| Ex. 1 | 160 | SG-5A1257 | 715 | 0.0028 | — | — | — |
| Ex. 2 | 160 | SG-5A1257 | 715 | 0.0056 | — | — | — |
| Ex. 3 | 160 | SG-5A1257 | 715 | 0.0014 | — | — | — |
| Ex. 4 | — | SG-5A1257 | 715 | 0.0028 | — | — | — |
| Ex. 5 | 160 | SG-4A1053 | 620 | 0.0077 | — | — | — |
| Ex. 6 | 160 | SG-531 | 640 | 0.0039 | — | — | — |
| Comp. Ex. 1 | 160 | — | — | — | — | — | — |
| Comp. Ex. 2 | 160 | — | — | — | TAP-45 | 585 | 0.0027 |
| Comp. Ex. 3 | 160 | — | — | — | SG-1505 | 645 | 0.0030 |
| Comp. Ex. 4 | 160 | — | — | — | SG-1650 | 565 | 0.0028 |
| Ex. 7 | 160 | SG-5A1257 | 715 | 0.0110 | — | — | — |
| Ex. 8 | 160 | SG-5A1257 | 715 | 0.0027 | — | — | — |
| Ex. 9 | — | SG-5A1257 | 715 | 0.0055 | — | — | — |
| Ex. 10 | 160 | SG-4A1053 | 620 | 0.0151 | — | — | — |
| Ex. 11 | 160 | SG-531 | 640 | 0.0077 | — | — | — |
| Ex. 12 | 160 | SG-5A1257 | 716 | 0.0055 | — | — | — |
| Comp. Ex. 5 | 160 | — | — | — | TAP-45 | 585 | 0.0053 |
| Comp. Ex. 6 | 160 | — | — | — | SG-1505 | 645 | 0.0061 |
| Comp. Ex. 7 | 160 | — | — | — | SG-1650 | 565 | 0.0057 |
| Comp. Ex. 8 | 160 | — | — | — | SG-100 | 475 | 0.0115 |

TABLE 3

| | Measurement results | | | | | | | |
|---|---|---|---|---|---|---|---|---|
| | Anti-glare property | Light resistance | | Visibility in dark place | | | | |
| | Visible light transmittance A-Y (%) | Nine-point scale by De Boer | ΔA-Y after 500 hours (%) | ΔA-Y after 1000 hours (%) | Photopic vision luminance (Cd/m$^2$) | Scotopic vision luminance (Cd/m$^2$) | Relative photopic vision luminance | Relative scotopic vision luminance | Relative scotopic vision luminance/ Relative pholopic vision luminance |
| Ex. 1 | 79.8 | 4 | −0.03 | 0.01 | 681 | 604 | 80 | 87 | 1.08 |
| Ex. 2 | 72.2 | 5 | −0.04 | 0.06 | 619 | 590 | 73 | 85 | 1.16 |
| Ex. 3 | 84.1 | 4 | −0.03 | −0.01 | 716 | 611 | 84 | 88 | 1.04 |
| Ex. 4 | 79.8 | 4 | −0.03 | 0.07 | 685 | 613 | 81 | 88 | 1.09 |
| Ex. 5 | 79.6 | 4 | −0.42 | −0.40 | 680 | 604 | 80 | 87 | 1.08 |
| Ex. 6 | 79.9 | 4 | −0.45 | −0.30 | 680 | 591 | 80 | 85 | 1.06 |
| Comp. Ex. 1 | 88.8 | 1 | −0.02 | −0.16 | 753 | 619 | 89 | 89 | 1.00 |

TABLE 3-continued

| | Anti-glare property | | Light resistance | | Visibility in dark place | | | | |
|---|---|---|---|---|---|---|---|---|---|
| | Visible light transmittance A-Y (%) | Nine-point scale by De Boer | ΔA-Y after 500 hours (%) | ΔA-Y after 1000 hours (%) | Photopic vision luminance (Cd/m²) | Scotopic vision luminance (Cd/m²) | Relative photopic vision luminance | Relative scotopic vision luminance | Relative scotopic vision luminance/ Relative pholopic vision luminance |
| Comp. Ex. 2 | 79.3 | 4 | 1.14 | 2.24 | 673 | 582 | 79 | 84 | 1.06 |
| Comp. Ex. 3 | 79.9 | 4 | 3.24 | 5.41 | 681 | 597 | 80 | 86 | 1.07 |
| Comp. Ex. 4 | 80.0 | 4 | 1.54 | 2.58 | 678 | 576 | 80 | 83 | 1.04 |
| Ex. 7 | 60.1 | 6 | −0.06 | 0.15 | 523 | 565 | 62 | 81 | 1.31 |
| Ex. 8 | 79.8 | 5 | −0.03 | 0.02 | 679 | 603 | 80 | 87 | 1.09 |
| Ex. 9 | 72.5 | 5 | −0.04 | 0.10 | 621 | 591 | 73 | 85 | 1.16 |
| Ex. 10 | 72.3 | 5 | −0.67 | −0.66 | 622 | 590 | 73 | 85 | 1.16 |
| Ex. 11 | 72.3 | 5 | −0.61 | −0.35 | 617 | 565 | 73 | 81 | 1.12 |
| Ex. 12 | 72.3 | 5 | −0.04 | 0.06 | 629 | 599 | 74 | 86 | 1.16 |
| Comp. Ex. 5 | 72.0 | 5 | 2.26 | 4.44 | 611 | 550 | 72 | 79 | 1.10 |
| Comp. Ex. 6 | 71.9 | 5 | 6.61 | 11.03 | 615 | 576 | 73 | 83 | 1.14 |
| Comp. Ex. 7 | 72.0 | 5 | 3.12 | 5.23 | 611 | 536 | 72 | 77 | 1.07 |
| Comp. Ex. 8 | 72.3 | 5 | 0.01 | 0.01 | 677 | 356 | 80 | 51 | 0.64 |

EXPLANATION OF SYMBOLS

1: Laminated glass
2: Interlayer film
2a: First surface
2b: Second surface
11: Laminated glass
12: Interlayer film
13: First layer (Interlayer film)
14: Second layer (Interlayer film)
15: Third layer (Interlayer film)
13a: Outer surface
15a: Outer surface
21: First laminated glass member
22: Second laminated glass member

The invention claimed is:

1. An interlayer film for laminated glass comprising:
a thermoplastic resin; and
at least one kind of ingredient among a phthalocyanine compound containing copper atom(s) and having a maximum absorption wavelength greater than or equal to 550 nm and less than or equal to 750 nm, a naphthalocyanine compound containing copper atom (s) and having a maximum absorption wavelength greater than or equal to 550 nm and less than or equal to 750 nm, an anthracyanine compound containing copper atom(s) and having a maximum absorption wavelength greater than or equal to 550 nm and less than or equal to 750 nm and an indanthrene compound containing copper atom(s) and having a maximum absorption wavelength greater than or equal to 550 nm and less than or equal to 750 nm,
wherein a content of the at least one kind of ingredient is greater than or equal to 0000001% by weight and less than or equal to 0.05% by weight in 100% by weight of the interlayer film, and
wherein a ratio L's/Ls of the relative scotopic vision luminance L's to the relative photopic vision luminance Ls is greater than or equal to 1.0 at the time of preparing laminated glass with two sheets of clear glass in accordance with JIS R3202 (1996).

2. The interlayer film for laminated glass according to claim 1,
wherein the Ls/Ls is greater than 1,0.

3. The interlayer film for laminated glass according to claim 1, comprising a thermoplastic resin and
having an absolute value of the difference in visible light transmittance ΔA -Y represented by the formula: (A-Y after irradiated with ultraviolet rays) -(A-Y before irradiated with ultraviolet rays) to be less than or equal to 1.0 at the time of preparing laminated glass with two sheets of clear glass in accordance with JIS R3202 (1996) and then irradiating the prepared laminated glass with ultraviolet rays for 500 hours using a quartz glass mercury lamp of 750 W in accordance with JIS R3205,
wherein a ratio L's/Ls of the relative scotopic vision luminance L's to the relative photopic vision luminance Ls is greater than 1.0 at the time of preparing laminated glass with two sheets of clear glass in accordance with JIS R3202 (1996).

4. The interlayer film for laminated glass according to claim 1, further comprising at least one kind of metal salt among an alkali metal salt and an alkaline earth metal salt.

5. The interlayer film for laminated glass according to claim 1,
wherein the thermoplastic resin is a polyvinyl acetal resin.

6. The interlayer film for laminated glass according to claim 1, further comprising a plasticizer.

7. A laminated glass, comprising:
a first laminated glass member;
a second laminated glass member; and
an interlayer film for laminated glass according to claim 1,
wherein the interlayer film for laminated glass is arranged between the first laminated glass member and the second laminated glass member.

8. The interlayer film for laminated glass according to claim 1, wherein the content of the at least one kind of ingredient is greater than or equal to 0.000001% by weight and less than or equal to 0.01% by weight in 100% by weight of the interlayer film.

9. The interlayer film for laminated glass according to claim 1, further comprising at least one of platinum particles and palladium particles.

10. The interlayer film for laminated glass according to claim 9, wherein the at least one of platinum particles and palladium particles are coated with silica.

* * * * *